United States Patent Office 2,759,957
Patented Aug. 21, 1956

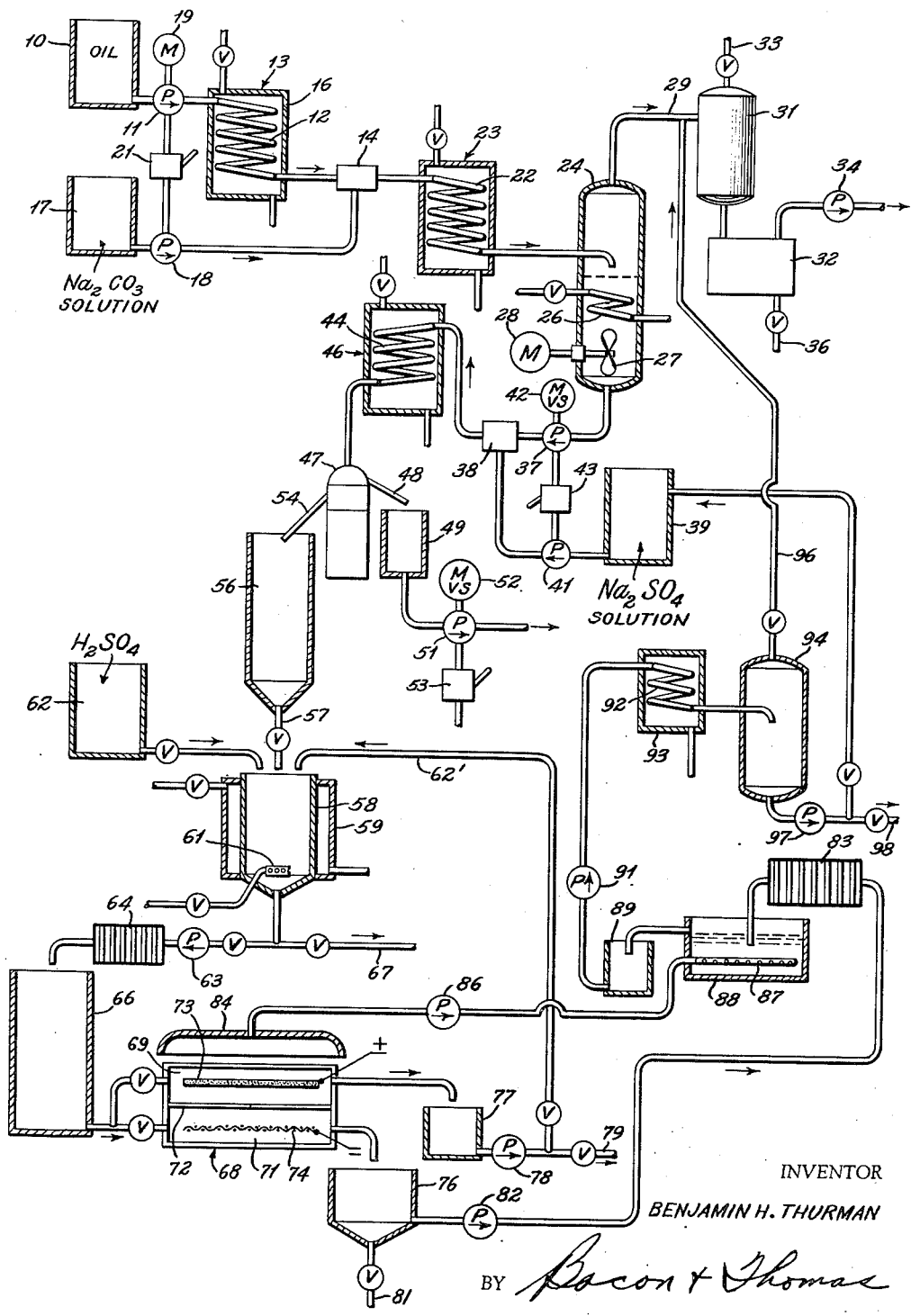

2,759,957
REFINING OF GLYCERIDE OILS

Benjamin H. Thurman, New York, N. Y., assignor to Benjamin Clayton, doing business as Refining, Unincorporated Application December 9, 1952, Serial No. 324,916

11 Claims. (Cl. 260—425)

This invention relates to the refining of glyceride oils and, more particularly, to an improvement in the continuous soda ash refining process as now commercially practised.

The continuous soda ash process is disclosed and claimed in the patent to Clayton 2,190,593 granted February 13, 1940. This process includes the steps of mixing an excess of soda ash in aqueous solution with either a crude or degummed glyceride oil containing free fatty acids and then dehydrating the mixture to remove most of the water therefrom and also carbon dioxide resulting from the reaction of the free fatty acids of the oil with the soda ash. The mixture is dehydrated by being heated to a temperature ranging between approximately 140° and 230° F. in a heating coil and then being flashed into a vacuum chamber. The dehydrated mixture is a liquid material and is pumped from the vacuum chamber and rehydrated. In commercial practice the rehydrating agent is usually an aqueous solution of soda ash and after rehydration the resulting mixture is continuously centrifugally separated into soapstock and oil. The oil discharged from the centrifugal separator is usually subjected to a further series of steps including a re-refining with a small amount of caustic soda and then a water-washing operation. Although the soda ash process usually involves two separate refining steps, one with soda ash and one with caustic soda, the losses therein approach very closely to the theoretical losses and are the lowest of any of the known glyceride oil refining operations.

The soapstock separated from the oil in the soda ash refining step, i. e., in the separation of the mixture after rehydration, is in most cases acidulated with sulfuric acid either by the refiner or by a soap-maker to recover crude fatty acids. Sufficient sulfuric acid must be employed to neutralize excess sodium carbonate and produce an acidic mixture which will separate into an aqueous layer and a fatty layer. The separation of the acqueous layer from the fatty layer is usually accomplished in a settling operation and the separated fatty layer is known as "black grease." It is an impure mixture of fatty acids and is a raw material from which fatty acids may be recovered for soapmaking and other purposes.

The aqueous layer from such separation is known as acid waste water and has heretofore been sent to waste. In the present commercial soda ash processes, such acid waste water contain sodium sulfate in concentrations usually ranging between 6 and 10%, a substantial amount of excess sulfuric acid and a small amount of fatty material in the form of small droplets dispersed throughout the aqueous material, as well as a substantial amount of soluble organic material including glycerine and usually choline. No practical method of recovering any of the materials contained in this acid waste water has heretofore been proposed, and the acid waste water has presented a serious waste disposal problem.

Although sodium sulfate is an extremely effective alkali metal salt for employment in the rehydration step of the soda ash process, the art has almost universally employed a solution of soda ash in the rehydration step. Soda ash is commercially available at a much lower price than sodium sulfate and it has been found more economical to rehydrate with an aqueous solution of soda ash even though it is necessary to employ additional sulfuric acid in the acidulation of the resulting soapstock to neutralize this additional soda ash. Although the acid waste water contains sodium sulfate, the solution is ordinarily too dilute for employment as a rehydrating solution and, furthermore, the acid waste water has a low pH, whereas an alkaline or at least a neutral material is required in the rehydration step.

In accordance with the present invention, it has been found that the major portion of the acid waste water can be converted into an alkaline material by a simple electrolytic treatment in the cathode compartment of an electrolytic cell. If necessary, the alkaline material can readily be concentrated by evaporation of water to produce an effective rehydrating solution, although in some cases it is possible to operate the process such that evaporation of water from the rehydrating solution is minimized or eliminated. At the same time the remaining minor portion of the acid waste water may have its acid content materially increased by treatment in the anode compartment of such cell, and this portion may be returned to the soapstock acidulation step. The employment of sodium sulfate as a dehydrating agent reduces the amount of sulfuric acid required in the soapstock acidulation step, and the amount of such acid, which is added from an outside source, is further reduced by the return of sulfuric acid from the electrolytic treatment of the present invention. That is to say, less sulfuric acid is required for neutralizing soda ash than in the prior soda ash process and no sulfuric acid is sent to waste as was the case in such prior processes.

It is therefore an object of the present invention to provide an improved process of refining glyceride oils in which a rehydration step is employed and in which sodium sulfate is generated from waste materials in the process and employed as part of a rehydration agent in the process.

A further object of the invention is to provide an improvement in the continuous soda ash process of refining glyceride oils in which acid waste water from a soapstock aciduation step is electrolytically treated in order to recover an aqueous material containing sodium sulfate which is utilized in the process as a rehydration agent so as to decrease the amount of sulfuric acid required in the soapstock acidulation step.

A still further object of the invention is to provide an improvement in the continuous soda ash process of refining glyceride oil in which an aqueous material containing a substantial amount of sulfuric acid is recovered from acid waste water in an electrolytic treating step and utilized in the soapstock acidulation step of the process.

Other objects and advantages of the invention will appear in the following description thereof given in connection with the attached drawing which is a diagrammatic view of apparatus suitable for carrying out the process of the present invention.

Referring to the drawing, the oil to be refined, which may be either crude or degummed oil, may be delivered to the process from a tank 10 and pumped by means of a pump 11 through a coil 12 of a heat exchanger 13 to a mixer 14. The heat exchanger 13 may include the coil 12 and a casing 16 surrounding the coil, through which any desirable heating medium may be passed. An aqueous solution of soda ash may be pumped from the tank 17 by means of a pump 18 to the mixer 14. The pumps 11 and 18 may form part of any suitable proportioning mechanism, for example, the pump 11 may be driven by a variable speed electric motor 19, which also drives the pump 18 through a variable speed mechanism 21. The mixer 14 may be of any known or suitable type of continuous mixer, an ordinary flow mixer being usually sufficient, and the resulting mixture may be passed through the coil 22 of another heat exchanger 23 which may be similar to the heat exchanger 13. The heated mixture may be delivered into a dehydrating chamber 24 provided with an internal heating coil 26 and an agitator 27 driven by a motor 28. Substantially all of the water and substantially all of the carbon dioxide formed during neutralization of free fatty acids with the soda ash may be removed from the mixture entering the dehydrating chamber 24 in vapor or gaseous form by means of a conduit 29 leading to a condenser 31 in turn connected to a receiver 32. The condenser 31 may be of any suitable type, for example, a jet condenser, into which water is introduced by means of a pipe 33. The water vapors are condensed in the condenser 31 and any carbon dioxide or other gas not dissolved in the water may be removed from the vacuum system by means of a pump 34. Water may be removed from the receiver 32 through a pipe 36 by means of a pump or barometric column (not shown).

The dehydrated mixture is predominantly neutral glyceride oil and contains sodium soap, excess soda ash and other materials originally present in the oil being refined. This mixture may be pumped from the dehydrating chamber 24 by means of the pump 37 and delivered to a mixer 38. A rehydrating solution, which is essentially a solution of sodium sulfate, may be withdrawn from a tank 39 by means of a pump 41 and also delivered to the mixer 38. The pumps 37 and 41 may also form part of a proportioning mechanism including a variable speed motor 42 and a variable speed device 43. The mixture from the mixer 38 may be passed through the heating coil 44 of another heat exchanger 46 and delivered into a continuous centrifugal separator 47. The separated oil may be delivered as the lighter effluent from the centrifugal 47 through a spout 48 into a receiving tank 49, and from the tank 49 such oil may be pumped by means of a pump 51 to further steps in the soda ash refining process. Such further steps will usually involve a mixing of the oil with a caustic soda solution followed by centrifugal separation and than a washing step in which water is mixed with the separated oil and another centrifugal separation step carried out to separate the wash water from the washed oil. Thus the pump 51 may form a part of another proportioning system including a variable speed motor 52 and a variable speed device 53.

The soapstock from the soda ash refining step may be discharged from the centrifugal separator 47 through a spout 54 and collected in a receiving tank 56. Such soapstock in the case of refining degummed oils will be largely an aqueous mixture of water and soap containing sodium sulfate and excess soda ash. When the crude oils being refined contain substantial amounts of gums, the soapstock will also contain substantially all of such gums, since they are hydrated and precipitated by the rehydrating solution and separate with the aqueous phase or soapstock from the centrifugal separator 47. The soapstock discharged into the tank 56 will usually be a rather viscous material but sufficiently fluid to be discharged from the tank through a valve in a pipe 57. The tank 56 may be sufficiently large to store enough soapstock so that acidulation of the soapstock may be carried out in batches. Thus a batch of soapstock may be delivered through a pipe 57 into an acidulation tank 58, such tank preferably being leadlined and provided with a heating jacket 59 through which any desired heating medium may be passed. The tank 58 may also have a steam distributor 61 also preferably made of lead positioned in its lower portion, through which steam or air or both may be introduced to agitate the mixture in the tank 58. Sulfuric acid, which will usually be in relatively concentrated form, may be delivered into the tank 58 from a tank 62 and, as hereafter described in more detail, an acid material containing substantial amounts of sulfuric acid and sodium sulfate may be returned from further steps in the process to the tank 58 through a pipe 62'.

The sulfuric acid decomposes the sodium soaps of the soapstock and neutralizes any excess soda ash present therein. In the case of soapstock-containing gums, sufficient strong acid is employed to char and decompose the gums so as to destroy their emulsifying properties. The mixture may be heated to temperatures up to and including the boiling temperature by passing a heating medium through the jacet 59 and may be agitated by steam introduced through the distributor 61. When the reaction is complete, the mixture is allowed to settle into an aqueous layer and a fatty layer. The lower aqueous layer may be withdrawn from the tank 58 by means of a pump 63. This lower aqueous layer is an acidic material which in present commercial processes contains a small amount of sulfuric acid, for example, between 1 and 2% sulfuric acid so as to have a pH in the neighborhood of 2. It also usually contains between 6 and 10% of sodium sulfate in solution, although it is contemplated that the sodium sulfate content may be increased up to 15 to 20% in accordance with the present invention for reasons which will appear below. The aqueous layer will also contain small amounts of fat and other organic material dispersed in small droplets throughout the aqueous material and also a substantial amount of organic material in solution. The dispersed organic material may be removed by passing the aqueous layer through a filter 64 shown as being of the filter press type and the filtered material may be discharged into a receiving tank 66.

After the aqueous layer has been withdrawn from the tank 58, the fatty layer may be withdrawn from the tank through a pipe 67. This material is the black grease of commerce and is a low-grade fatty material which can be purified in known operations to recover fatty acids therefrom.

The filtered aqueous material in the tank 66 may be withdrawn and delivered to an electrolytic cell 68. The cell is shown diagrammatically in plan view and may include an anode chamber 69 separated from a cathode chamber 71 by means of a porous diaphragm 72. The porous diaphragm 72 may be of any suitable material such as heavy canvas or heavy cloth made from various acid- and alkali-resistant synthetic fibers, for example, fibers of polyvinyl chloride. The anode compartment 69 may contain an anode 73 of any suitable acid-resistant material such as compressed carbon or graphite. The cathode compartment may contain a cathode 74 of any alkali-resistant material such as iron, ordinary iron hardware cloth being a suitable material. The major portion of the acidic, aqueous material from the tank 66 may be passed through the cathode compartment 71 and a minor amount through the anode compartment 69. That is to say, the ratio of anolyte to catholyte may range from approximately 1 to 3 to 1 to 7.

When a direct current is passed through the solutions in the two compartments between the anode 73 and the cathode 74, the pH of the catholyte increases rapidly. That is to say, a pH above 10 is easily obtained. Also the pH of the anolyte decreases and the sulfuric acid content thereof increases. For example, filtered acid water from a typical soda ash soapstock acidulation step as now commercially practised had a pH of approximately 2, a sulfuric acid content of approximately 1.6% and a sodium sulfate content of approximately 8.4%. The pH of the portion of this material forming the catholyte was raised to 10.4 to produce an alkaline material. In general, the concentration of sodium sulfate in the catholyte will not be materially changed, although in some cases a small increase has been noted, for example, in the present case the percentage of sodium sulfate in the catholyte increased to 9%. The portion forming the anolyte had its pH reduced to 0.6 and had its sulfuric acid concentration increased to 5.5%. The sodium sulfate concentration in the anolyte somewhat decreased, i. e., to 5.7% as compared to the 8.4% in the original waste water. In the example just described the ratio of anolyte to catholyte was 1 to 4. Acid waste waters having higher concentrations of sodium sulfate, for example up to 20%, give similar results except that the concentrations of sodium sulfate is proportionally increased in the discharged anolyte and catholyte.

The alkaline catholyte may be discharged into receiving tank 76 and the acidic anolyte discharged into a receiving tank 77. The acid anolyte may be pumped back to the acidulation tank 58 by means of a pump 78 and the pipe 62'. Ordinarily, all of the acid anolyte will be returned to the acidulation tank 58, so as to utilize all of the sulfuric acid therein, although, if desired, a portion thereof may be diverted from the process through the pipe 79. Any sodium sulfate thus returned to the acidulation tank 58 will eventually be discharged with the catholyte from the cathode compartment of the cell 68 and thus delivered into the receiving tank 76.

The alkaline catholyte from the cathode compartment 71, if highly alkaline, as described above, will ordinarily contain a flocculent precipitate. The exact nature of this precipitate has not been determined but it is apparently made up at least in part of hydroxides of polyvalent metals originally contained in complex organic compounds in the oil being refined and liberated in the acidulation step in tank 58. A portion or all of this precipitate may sometimes be settled in the tank 76, in which case it may be withdrawn through the pipe 81. The alkaline aqueous material from the tank 76 may be withdrawn therefrom by a pump 82 and if not completely clarified may be passed through a filter 83.

The filtered material contains an appreciable amount of organic material in solution, and such organic material may be relatively highly colored. It has been found that a treatment of the highly alkaline aqueous material with oxygen will substantially completely decolorize it. A considerable amount of oxygen is produced in the anode compartment of the cell 68 and the element 84 is intended to represent a relatively tightly fitting hood covering the anode compartment 69 of the cell 68. The oxygen produced by electrolytic action in the anode compartment 69 may be withdrawn therefrom by a pump 86 and delivered through a distributor 87 into the lower portion of a decolorizing tank 88. The aqueous material from the filter 83 may be delivered into the tank 88 such that oxygen from the cell 68 is bubbled upwardly therethrough to decolorize it. The decolorized aqueous solution of sodium sulfate may be delivered into a receiving tank 89. Instead of employing oxygen from the electrolytic cell, various oxygen-liberating materials, such as hydrogen peroxide or alkali metal peroxides, may be admixed with the filtered material in the tank 88 to decolorize the same. It will be apparent that the decolorizing step may be omitted and in any event the aqueous material collected in the tank 89 is essentially a solution of sodium sulfate, although it will still contain substantial amounts of soluble organic material.

The rehydrating solution employed in the soda ash process should contain, in general, a minimum of about 15% sodium sulfate and, if the concentration of the solution collected in tank 89 in a particular process has a lesser concentration, it is desirable to concentrate such solution. This may be accomplished, for example, by withdrawing the aqueous solution from the tank 89 by a pump 91, passing it through the coil 92 of a heat exchanger 93 and flashing the heated aqueous material into an evaporating chamber 94. Water vapors may be withdrawn from the evaporating chamber through a pipe 96 and delivered to the condenser 31 previously described. The aqueous solution can thereby be concentrated in the evaporating chamber 94 to a desired concentration, for example, a concentration between 15 and 20%. The concentrated solution may be withdrawn from the evaporating chamber 94 by means of a pump 97 and delivered back to the supply tank 39 for sodium sulfate solution.

The concentration of the solution from the tank 89 may be effected in other ways, for example, by employing electrolytic concentrating cells or crystallization steps. In carrying out the latter type of concentration, sodium sulfate decahydrate may be crystallized from a sodium sulfate solution by cooling such solution. For example, cooling a sodium sulfate solute to 0° C. will cause crystallization of the decahydrate until the remaining solution has a sodium sulfate concentration of 4.76% by weight. The dehydrate crystallizes readily and can be easily removed from such remaining solution. By thus cooling a portion of the solution from the tank 89 and recovering decahydrate crystals therefrom, which crystals are added to another portion of the solution from the tank 89, the desired concentration can be effected. The solution from which the crystals are separated may be discharged from the process.

If it is not necessary or desirable to decolorize the catholyte discharged from the cell 68 before employing it for a rehydrating solution or discharging it from the process, the treatment of this material in the cell may be decreased such that a pH just above 7, for example 7.5 to 8, is produced. In this case no substantial amount of the flocculent precipitate above referred to is produced and the filter 83 as well as the decoloriding step carried out in the tank 88 can be omitted. The rehydrating solution need not have a pH above 7.5 or 8 and even if the treatment in the cell is such that the pH of the solution from the tank 89 is substantially higher, for example, 10.5 or 11, a portion of the acidic anolyte may be admixed with such solution, if desired, in order to reduce its pH to any desired value above about 7.5.

Soda ash is continuously added to the system from the tank 17 in the original refining step. No substantial amount of this soda ash is discharged from the system with the partially refined oil and therefore substantially all of the added soda ash is converted into sodium sulfate in the tank 58. Also substantially no sodium sulfate is discharged from the system with the fatty material through the pipe 67 and, if all of the sodium sulfate were returned to the tank 39, the amount of sodium sulfate would rapidly build up in the system. Similarly, if all of the soluble organic material in the aqueous sodium sulfate solution discharged from the evaporating chamber 94 were returned to the sodium sulfate solution tank 39, this organic material would also build up in the system. It is therefore desirable to discharge a substantial amount of sodium sulfate solution containing organic material from the system through the pipe 98. The amount of sodium sulfate thus discharged must on the average be substantially equivalent to the sodium carbonate introduced from the tank 17, provided no anolyte is discharged from the process through pipe 79. The water discharged with this solution as well as any water evaporated in the evaporating chamber 94 is that added in the acidulation step, i. e., to tank 58, where the sulfuric acid is added, since substantially none of the water added with the soda ash solution from the tank 17 reaches the soapstock acidulation step. That is to say, substantially all of the water forming part of the soda ash solution from the tank 17 is removed in the dehydrating chamber 24 and discharged from the system through the pipe 36.

The concentration of sodium sulfate in the solution reaching the tank 89 and, therefore, the amount of water which must be evaporated in the evaporating chamber 94 in order to produce a rehydrating solution of proper concentration depend largely upon the concentration of sodium sulfate which can be tolerated in the tank 58 during acidulation of the soapstock and separation of the aqueous phase from the fatty phase. As stated above, the sodium sulfate concentration in the separated aqueous phase (acid waste water) in present commercial operations using a soda ash solution as the rehydrating solution is usually between 6 and 10%. The present process can be successfully operated with such sodium sulfate concentration, in which case a considerable amount of water added during the soapstock acidulation step must be evaporated in the evaporating chamber 94. However, the present invention contemplates concentrations of sodium sulfate in the separated aqueous phase between approximately 15 to 20%, in which case no evaporation of water in the evaporating chamber 94 is required and the concentrating step may be omitted. The invention also contemplates sodium sulfate concentrations between 10 and 15% in the aqueous phase separated in the tank 58; it being apparent that the higher the sodium sulfate concentration in the separated aqueous phase, the less the amount of water which must be evaporated in the evaporating chamber 94. The method illustrated is thus able to handle acid waste water (the aqueous phase separated in the tank 58) ranging from low sodium sulfate concentrations, i. e., 4 to 6%, up to relatively high concentrations such as 20%.

Since the electrolytic cell 68 is employed primarily to raise the pH of the acid waste water from the acidulation step and large amounts of alkali and acid need not be generated in the cell 68, the electrolytic operation can be carried on with a minimum of expense. Thus a rehydrating solution containing sodium sulfate for use in a soda ash refining process and having a pH between approximately 7.5 and 11 can be inexpensively generated from what has heretofore been a waste material, and at the same time a considerable amount of sulfuric acid is also produced, this acid being usable in the soapstock acidulation step to reduce the amount of sulfuric acid which must be supplied to the process. The inexpensive source of sodium sulfate thus provided enables this material to be economically employed as a rehydrating agent so as to reduce the amount of soda ash which must be neutralized in the acidulation step, further reducing the amount of sulfuric acid which must be introduced into the process.

The aqueous solution of sodium sulfate discharged from the system through the pipe 98 also contains soluble organic matter such as glycerine and choline. As stated above, the sodium sulfate concentration of this solution will usually be between approximately 15 and 20%. Since a portion of this solution is recirculated in the system, there is a buildup of soluble organic material therein and the concentration of such soluble organic material is usually several itmes that in the acid waste water from present commercial soda ash refining processes. Because of the higher concentrations and the alkaline nature of this discharged aqueous solution, the recovery of both sodium sulfate and the soluble organic material therein as valuable by-products appears economically feasible.

I claim:
1. In a process of refining a glyceride oil in which a dehydrated mixture formed by dehydrating a mixture of said oil and an aqueous solution of soda ash is rehydrated with an aqueous rehydratting medium and is then centrifugally separated into oil and soapstock and the thus separated soapstock is acidulated with sulfuric acid and separated into a fatty phase and an acidic aqueous phase containing sodium sulfate and excess sulfuric acid, the improvement which comprises, electrolytically treating at least a portion of the thus separated aqueous phase in an electrolytic cell by passing direct current therethrough from an anode in contact with an aqueous anolyte to a cathode in contact with a portion of said aqueous phase as a catholyte and separated from said anode by a porous diaphragm so as to render said catholyte alkaline and produce an alkaline solution of sodium sulfate and introducing at least a portion of said alkaline solution into said dehydrated mixture as said aqueous rehydrating medium.

2. The process as defined in claim 1 in which another portion of said separated aqueous phase forms the anolyte in said cell and has its sulfuric acid content increased and the resulting acidic aqueous solution is introduced into said separated soapstock to provide at least a part of the sulfuric acid employed to acidulate said separated soapstock.

3. The process as defined in claim 1 in which said separaated aqueous phase is filtered to remove suspended fatty material prior to being electrolytically treated in said cell.

4. The process as defined in claim 2 in which the said alkaline catholyte has its pH raised to above 10 and is filtered to remove any precipitate prior to being employed as said rehydrating medium.

5. The process as defined in claim 2 in which oxygen formed at the anode of said cell is introduced into said aqueous alkaline solution of sodium sulfate to decolorize said solution.

6. The process as defined in claim 1 in which the said alkaline catholyte has its pH raised to above 10 and is filtered to remove any precipitate prior to being employed as said rehydrating medium.

7. The process as defined in claim 1 in which an amount of water is added during acidulation of said separated soapstock which will produce an alkaline catholyte during electrolytic treatment of separated aqueous phase in said cell which has a concentration of sodium sulfate between approximately 15 and 20%.

8. The process as defined in claim 1 in which the alkaline catholyte is concentrated by evaporation of water to provide an aqueous rehydrating medium containing between approximately 15 and 20% sodium sulfate.

9. In a process of refining a glyceride oil in which a dehydrated mixture formed by dehydrating a mixture of said oil and an aqueous solution of soda ash is rehydrated with an aqeuous rehydrating medium, and is then centrifugally separated into oil and soapstock and the thus separated soapstock is acidulated with sulfuric acid and separated into a fatty phase and an acidic aqueous phase containing sodium sulfate and excess sulfuric acid, the improvement which comprises, passing at least a portion of the thus-separated aqueous phase to the cathode compartment of an electrolytic cell having an anode compartment and a cathode compartment separated by a diaphragm permitting the passage of ions therethrough, passing another portion of said aqueous phase to the anode compartment of said cell, passing a direct current between an anode in contact with the aqueous phase in the anode compartment and a cathode in contact with the aqueous phase in the cathode compartment so as to provide an alkaline sodium sulfate solution as a catholyte effluent and an anolyte effluent containing sodium sulfate and an increased amount of sulfuric acid, introducing at least a portion of said alkaline cathoylte as said rehydrating agent, and introducing at least a portion of said acidic anolyte effluent into said separated soapstock to provide at least a portion of the sulfuric acid employed to acidulate said separated soapstock.

10. The process as defined in claim 9, in which said portions of acidic aqueous phase from the soapstock acidulation are introduced into the anode and cathode compartments of said cell respectively in proportions within the range of from approximately 1 to 3 to 1 to 7.

11. The process as defined in claim 9, wherein the alkaline catholyte effluent has a pH within the range of from slightly above 7 to about 11.

References Cited in the file of this patent

UNITED STATES PATENTS 2,190,593     Clayton               Feb. 13, 1940

OTHER REFERENCES

Atwell et al.: Industrial and Engineering Chemistry, vol. 15 (June 1923), pages 617–620.

Stender et al.: Transactions of the Electrochemical Society, vol. 68 (1935), pages 493–520.